United States Patent
Murata et al.

(10) Patent No.: US 6,208,283 B1
(45) Date of Patent: Mar. 27, 2001

(54) SYNTHETIC APERTURE RADAR SYSTEM AND PLATFORM POSITION MEASURING APPARATUS USED IN THE SAME

(75) Inventors: Minoru Murata, Tokyo; Masanori Miyawaki, Kanagawa, both of (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/340,425

(22) Filed: Jun. 28, 1999

(30) Foreign Application Priority Data

Jul. 3, 1998 (JP) .................................................. 10-188705

(51) Int. Cl.[7] .................................................. G01S 13/90
(52) U.S. Cl. .............................. 342/25; 342/195; 342/190
(58) Field of Search .................................... 342/197, 191, 342/196, 195, 192, 25, 194

(56) References Cited

U.S. PATENT DOCUMENTS

| | | | |
|---|---|---|---|
| 5,546,085 | * | 8/1996 | Garnaat et al. ........................ 342/25 |
| 5,659,318 | * | 8/1997 | Madsen et al. ........................ 342/25 |
| 5,777,573 | * | 7/1998 | Klausing et al. ...................... 342/25 |
| 5,805,099 | * | 9/1998 | Nagata .................................. 342/25 |
| 5,812,082 | * | 9/1998 | Moreira et al. ....................... 342/25 |
| 5,847,673 | * | 12/1998 | BeBell ................................... 342/25 |
| 5,945,937 | * | 8/1999 | Fujimura .............................. 342/25 |
| 6,005,509 | * | 12/1999 | Buckruss ............................... 342/25 |
| 6,011,505 | * | 1/2000 | Poehler et al. ........................ 342/25 |
| 6,018,306 | * | 1/2000 | Serbin .................................. 342/25 |

FOREIGN PATENT DOCUMENTS

| | | |
|---|---|---|
| 6-160515 | 6/1994 | (JP) . |
| 7-72244 | 3/1995 | (JP) . |
| 8-29528 | 2/1996 | (JP) . |
| 8-2546175 | 8/1996 | (JP) . |
| 9-189762 | 7/1997 | (JP) . |
| 9-230039 | 9/1997 | (JP) . |
| 9-2702076 | 10/1997 | (JP) . |
| 10-2751901 | 2/1998 | (JP) . |

OTHER PUBLICATIONS

Japanese Office Action issued Apr. 4, 2000 in a related application with English translation of relevant portions.

Y. Iguchi, "Remote Sensing for Resource Investigation: Practical Use Series 5 Synthetic Aperture Radar (SAR)", *Resource Observation and Analysis Centers,* Mar. 31, 1992, pp. 153–198.

A.L. Gray, et al., "Repeat–Pass Interferometry With Airborne Synthetic Aperture Radar", *IEEE Transactions on Geoscience and Remote Sensing,* vol. 31, No. 1, Jan. 1993, pp. 180–191.

A.K. Gabriel, et al., "Mapping Small Elevation Changes Over Large Areas: Differential Radar Interferometry", *Journal of Geophysical Research,* vol. 94, No. B7, Jul. 10, 1989, pp. 9183–9191.

* cited by examiner

Primary Examiner—John B. Sotomayor
(74) Attorney, Agent, or Firm—Ostrolenk, Faber, Gerb & Soffen, LLP (57) ABSTRACT

A synthetic aperture radar system fluctuation compensating apparatus includes a synthetic aperture radar mounted on a flying unit, a data acquiring unit, a position measuring unit and a position determining unit. The data acquiring unit receives a reception data by the synthetic aperture radar. The position measuring unit measures a position of the flying unit to generate a position data. The position determining unit determines a correct position of the flying unit based on the reception data and the position data to generate a compensated position data.

11 Claims, 9 Drawing Sheets

SYNTHETIC APERTURE RADAR SYSTEM AND PLATFORM POSITION MEASURING APPARATUS USED IN THE SAME

BACKGROUND OF THE INVENTION

1. Field of the Invention

The present invention relates to a synthetic aperture radar system and a platform position measuring apparatus used in the same, and more particularly to a technique of increasing the measuring precision of a position of a flying body on which a platform is mounted.

2. Description of the Related Art

A synthetic aperture radar (SAR) is mounted on an artificial satellite and an aircraft and is used to obtain an image of a portion of a ground surface in a high resolution regardless of night and day and the weather of the ground surface portion.

Figure 1:
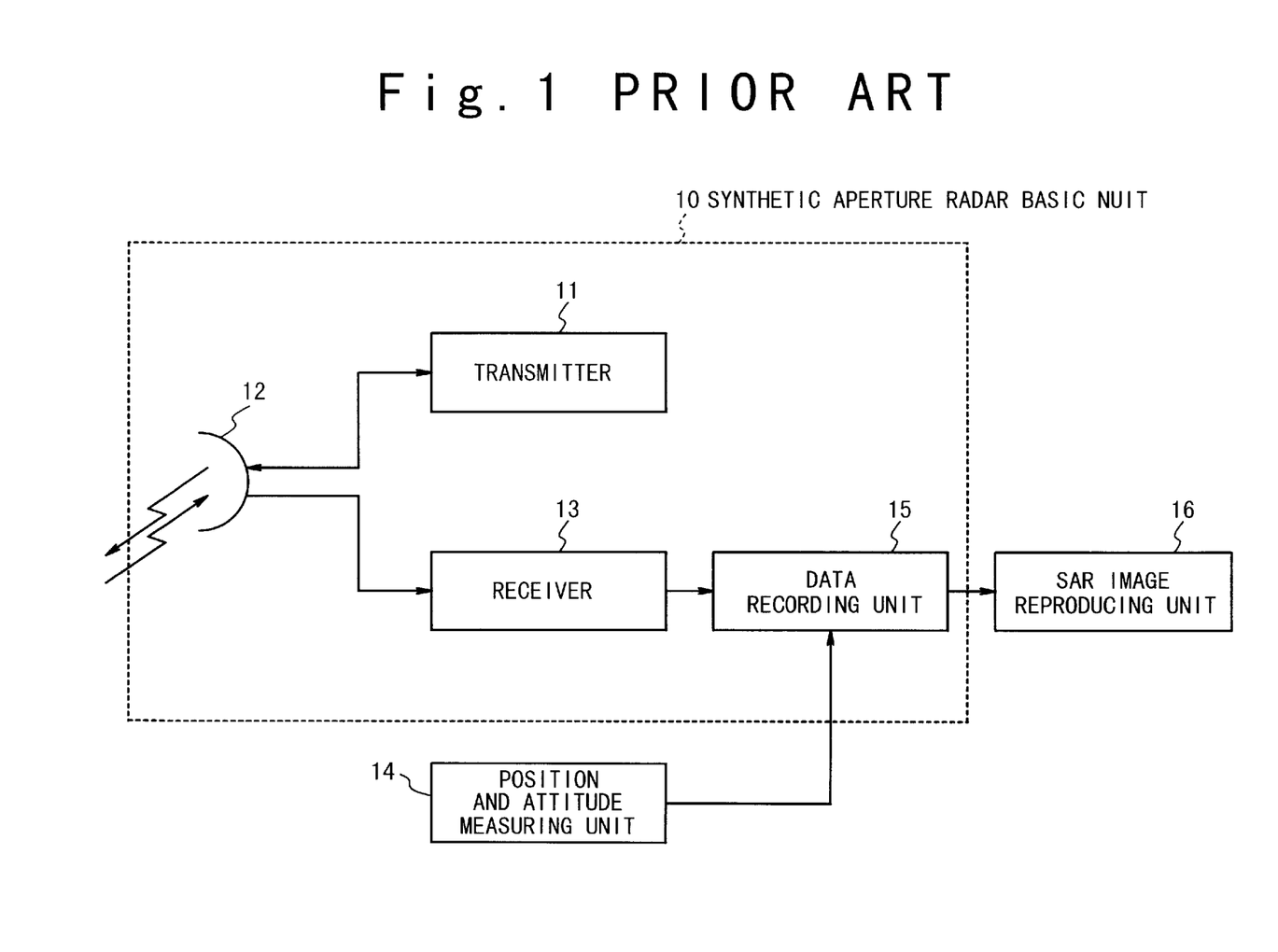
FIG. 1 is a block diagram illustrating the structure of a first conventional example of a basic synthetic aperture radar system.

FIG. 1 is a block diagram illustrating a basic structure example of a conventional synthetic aperture radar. Referring to FIG. 1, a synthetic aperture radar basic unit 10 and a position and attitude measuring apparatus 14 are mounted on a platform (not shown). In the synthetic aperture radar basic unit 10, a pulse signal is generated by a transmitter 11 and is radiated as a electromagnetic wave for the ground from a transmission and reception antenna 12. The electromagnetic wave is reflected on the ground surface and is received by the transmission and reception antenna 12. The received electromagnetic wave is amplified and detected by a receiver 13 and is recorded on a recording medium (not shown) such as a magnetic tape in a complex data format by a data recording unit 15.

A series of operations are repeated in a predetermined time interval of 1 msec. or at the frequency of 1000 Hz. Also, a position and attitude data of the platform measured by the position and attitude measuring unit 14 is also recorded by the data recording unit 15 together with the receive data by the synthetic aperture, radar basic unit 10.

After the measurement, an image is produced from the recorded data by an SAR (Synthetic Aperture Radar) image reproducing unit 16 through an SAR image reproducing process which is well known. The SAR image reproducing process is described in, for example, the fourth chapter of "Remote Sensing for Resource Investigation: practical use series 5 Synthetic Aperture Radar (SAR)" by Yoshirou Iguchi (published from Resource Observation and Analysis Centers on Mar. 31, 1992, pp153–198).

When the fluctuation of the platform in position is large in an aircraft, a fluctuation compensating process is executed using the platform position and attitude data synchronous with a pulse signal in the measurement in the case of the SAR image reproducing process. Thus, it is necessary to prevent the degradation of a resolution of the reproduced image and the warp of the image due to the fluctuation of the platform.

The fluctuation compensating process is a process in which the variation of a phase of the reception signal is compensated or corrected based on the actual fluctuation of the platform, supposing that the platform flies on an ideal straight route at a uniform velocity. This process is well known. This process is described in, for example, "III. DATA PROCESSING" of "Repeat-Pass Interferometry with Airborne Synthetic Aperture Radar" by A. L. Grayet.al (IEEE TRANSACTIONS ON GEOSCIENCE AND REMOTE SENSING, Vol.31, No.1, JANUARY 1993, pp.180–191).

In order to obtain an SAR reproduction image without the degradation of the resolution through the fluctuation compensating process, it is necessary to compensate the platform position and attitude data for the fluctuation of the platform in the measurement in precision of $\frac{1}{8}$ or below of the measurement wavelength. Because the synthetic aperture radar system at present uses the wavelength from several cm to about tens of cm, the required detection precision of the fluctuation of the platform is from several mm to several cm.

Also, in recent years, a method of detecting a minute diastrophism to the extent of the wavelength of the measurement electromagnetic wave or below by unit of a differential interferometry type synthetic aperture radar is developed. This method is described in, for example, "Mapping Small Elevation Changes Over Large Areas: Differential Radar Interferometry" by A. K. Gabrielet.al (Journal of Geophysical Research, Vol.94, No.B7, 1989, pp.9183–9191).

In this case, it is necessary to detect the fluctuation of the platform in the precision higher than that of the detection of the minute diastrophism. The fluctuation compensating process is executed based on the detecting result. Therefore, it is required that the fluctuation of the platform is detected in the precision of about several mm for detection of the minute diastrophisms of several cm such as earthquake, volcanism, landslide, and land subsidence. In this way, it is very important to obtain the fluctuation data of the platform in a high precision, when a data is obtained by the synthetic aperture radar system.

Conventionally, as the position and attitude measuring unit which is mounted on the platform together with the synthetic aperture radar is generally used a global positioning system (GPS), an inertial navigation system or a hybrid navigation system of a combination of them. The position measurement precision is about several m in the hybrid navigation system, and about several cm in kinematic GPS using a carrier wave. Therefore, the above systems are insufficient in precision for the fluctuation compensating process in the synthetic aperture radar and the diastrophism detection in the differential interferometry type synthetic aperture radar.

A method of compensating for the fluctuation in the synthetic aperture radar and a method of measuring a position by the radar are described in Japanese Laid Open Patent Application (JP-A-Heisei 6-160515) to solve the above problem.

Figure 2:
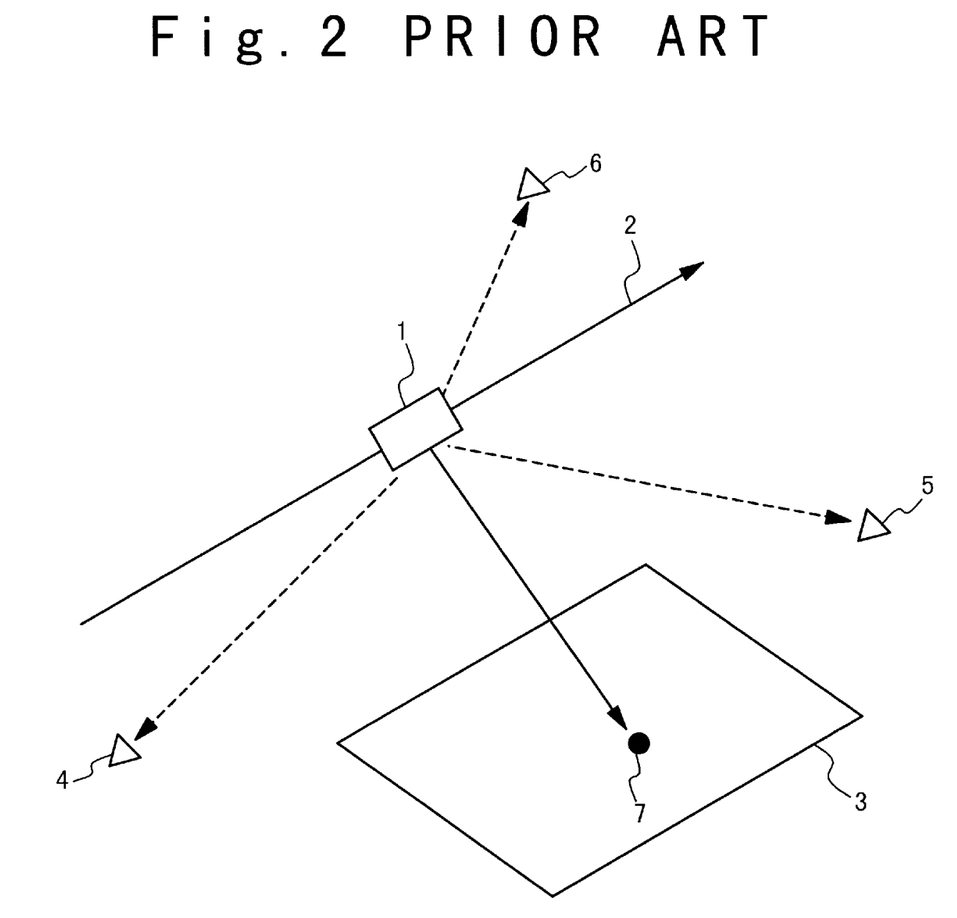
FIG. 2 is a diagram showing a method of measuring a position of a platform in a second conventional example of a basic synthetic aperture radar system.

Next, the method of measuring the position of the platform on which the synthetic aperture radar is mounted will be described. FIG. 2 is a diagram illustrating the conventional method of measuring the position of the platform using the radar.

Referring to FIG. 2, a reference numeral 1 denotes a radar platform, and a reference numeral 2 denotes a platform flight track. A reference numeral 3 denotes an measurement object area. Reference numerals 4, 5 and 6 denote first, second and third repeaters. A reference numeral 7 denotes a phase compensation basing point. Here, the first repeater 4, the second repeater 5 and the third repeater 6 are arranged in different positions.

Figure 3:
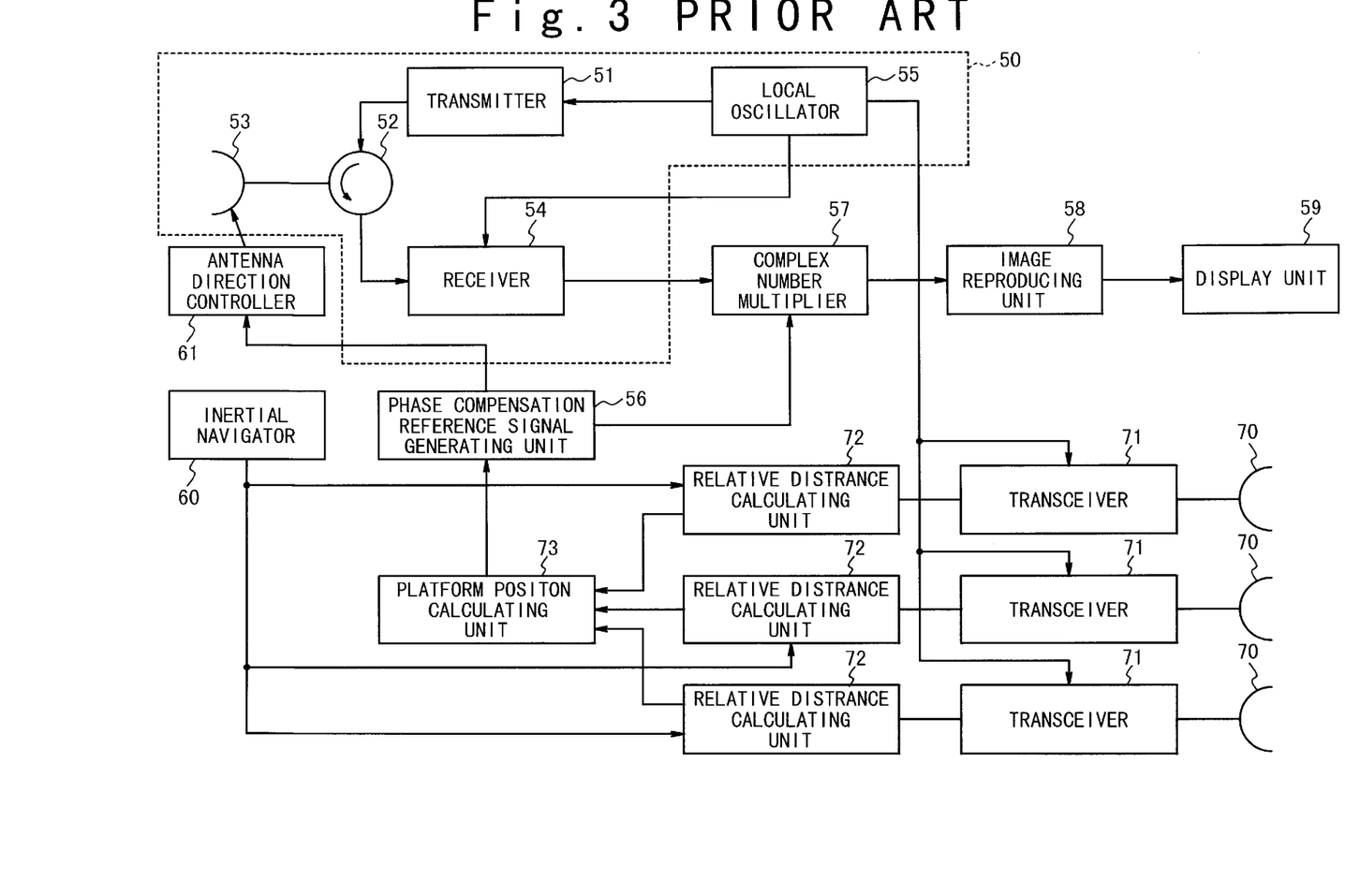
FIG. 3 is a block diagram illustrating the structure of the second conventional example of a basic synthetic aperture radar system.

FIG. 3 is a block diagram illustrating the structure of a conventional fluctuation compensating and position measuring system in a synthetic aperture radar system. Referring to FIG. 3, the system is composed of a synthetic aperture radar basic unit 50, which is equivalent to the synthetic aperture radar basic unit 10 shown in FIG. 1. In the synthetic aperture radar basic unit 50 is composed of a transmitter 51, a transmission and reception switching unit 52, a transmission and reception antenna 53, a receiver 54 and a local oscillator 55. The synthetic aperture radar system is further composed of a phase compensation reference signal generating unit 56, a complex data multiplier 57, an image reproducing unit 58 and a display unit 59. Also, the synthetic aperture radar system is further composed of an inertial navigation system 60 and an antenna directional control unit 61. Moreover, the synthetic aperture radar system is further composed of antennas 70, transceivers 71, relative distance calculating units 72 and a platform position calculating unit 73. The antenna sends and receives a electromagnetic wave to and from a repeater. The transceiver 71 is connected with the antenna 70. The relative distance calculating unit 72 is connected with the transceiver 71 and the inertial navigation system 60 and calculates a relative distance between the radar platform 1 and the phase compensation reference point 7. The platform position calculating unit 73 determines the position of the platform from the relative distances calculated by the relative distance calculating units 72.

The operation of the above-mentioned system will be described with refers to FIG. 2 and FIG. 3. The operation of the synthetic aperture radar basic unit 50 is the same as described above. After the repeater receives and amplifies a high frequency signal which has been radiated from the radar, the repeater sends back the amplified high frequency signal to the received direction.

In the method of measuring the position by the radar, the high frequency signals are transmitted to the first repeater 4, the second repeater 5 and the third repeater 6 using the transmission and reception antennas 70 and the transceivers 71. The amplified high frequency signals are received from the first repeater 4, the second repeater 5 and the third repeater 6 by use of the transmission and reception antennas 70 and the transceivers 71.

In this case, a relative distance between the radar platform and the repeater is calculated from the reception signal which has been received by the above-mentioned transceiver 71 based on a electromagnetic wave propagation time and a phase by the relative distance calculating unit 72. The position coordinate of the radar platform is calculated from the above-mentioned relative distances and the positions of the repeaters by the platform position calculating unit 73 connected with the above-mentioned relative distance calculating unit 72.

In the above mentioned conventional method of measuring a position of the platform, the radar used for the position measurement is different from the radar used for the SAR. Therefore, 3 or more antennas and transceivers are required to send and receive the high frequency signal to and from the repeater, in addition to the synthetic aperture radar basic unit.

Also, the antenna to send and receive the high frequency signal to and from the repeater must be controlled to always face the repeaters. Therefore, a control mechanism become necessary. Thus, there is a problem that the structure of the synthetic aperture radar system becomes very complicated.

Also, the antennas which send and receive high frequency signals to and from the repeaters are different from each other. Also, the positions of the repeaters are different from each other. Therefore, in order to calculate the precise position of the platform, their relative position relation must be considered. Thus, there is a problem that the calculation of the platform position becomes very complicated.

In conjunction with the above description, an interferometry type synthetic aperture radar fluctuation compensating apparatus is disclosed in Japanese Patent No. 2546175. In this reference, the apparatus is composed of a an integration time calculating section, a summation section, a fluctuation compensating data calculating section and a fluctuation compensating section. The integration time calculating section calculates an integration time of an SAR reproduction process based on a position and speed data of a flying body. The summation section sums fluctuation data outputted from a recording and reproducing section based on the integration time. The fluctuation compensating data calculating section calculates a fluctuation compensating data based on the summation data and the position and speed data. The fluctuation compensating section calculates a difference between an interference data outputted from an interference processing section and the fluctuation compensating data and outputs the difference as a compensation interference data.

Also, an interferometry type synthetic aperture radar apparatus is disclosed in Japanese Laid Open Patent Application (JP-A-Heisei 9-230039). In this reference, the apparatus is composed of a radar section, a plural image generating section, an image mixing section and a phase unlapping section. The radar section performs measurement using a synthetic aperture radar apparatus to obtain a plurality of geometry images in which measurement conditions are different from each other. The plural image generating section combines the plurality of geometry images to interference to each other and generate a plurality of interference images. The image mixing section mixes the plurality of interference images. The phase unlapping section converts the mixed plurality of interference images into images with data corresponding to the geometrical height.

Also, a radar apparatus is disclosed in Japanese Laid Open Patent Application (JP-A-Heisei 8-29528). In this reference, the apparatus is composed of a signal processing section which performs a compensating process in a distance direction and a synthetic aperture process to a reflected signal from a target to generate a high resolution radar image signal. The signal processing section is composed of a reference point detecting section 121, a smoothing section 122, and a range walk compensating section 123. The reference point detecting section 121 detects a reference point of the target. The smoothing section 122 acquires the frequency of the reference point plural times from a plurality of transmission signals and specifies the frequency of the reference point from the plurality of frequencies to determine a speed. The range walk compensating section 123 synthesizes the speed of the target and the speed of a moving body externally given to determine the change of a relative distance to the target and compensates the position of a reflected signal from the target for every range cell corresponding to a resolution in a distance direction.

Also, a satellite mounted synthetic aperture radar apparatus is disclosed in Japanese Patent No. 2751901. In this reference, the apparatus is composed of an antenna section and a chirp pulse generator. The antenna section is mounted on a plane including a traveling direction of a satellite and radiates two beams for the ground and reflection beam of the radiated beams. The radiated beams have slightly different radiation angles in a perpendicular to the traveling direction. The chirp pulse generator generates chirp pulses corresponding to the two radiated beams such that the delay inclination characteristic of the chirp pulses are inverted for every pulse.

Also, an SAR/GPS inertial distance measuring method is disclosed in Japanese Patent No. 2702076. In this reference, an air plane is moved along a predetermined route, and a relative position and speed along the route is precisely measured using the GPS with an inertial navigation system. A first synthetic aperture radar map is generated and a target pixel is specified in the first synthetic aperture radar map corresponding to a target. Also, additional synthetic aperture radar maps are generated and a target pixel is specified in the additional synthetic aperture radar map. A position of the target pixel is calculated in the inertial navigation system and the GPS and at the same time a propagation speed of a radar wave to the target is calculated using the air plane position data calculated by the GPS. A precise position of the target pixel is calculated using the calculated radar wave propagation speed.

SUMMARY OF THE INVENTION

Therefore, an object of the present invention is to provide a synthetic aperture radar system in which the fluctuation of a flying body in position can be compensated without addition of a special unit and a complicated computation.

Another object of the present invention is to provide a synthetic aperture radar system in which the degradation of a resolution can be prevented.

Still another object of the present invention is to provide a synthetic aperture radar system in which the position of a flying body can be measured in a high precision to make it possible to detect a minute diastrophism by a differential interferometry type SAR technique.

Yet still another object of the present invention is to provide a method of measuring a platform position used in the above-mentioned synthetic aperture radar system.

In order to achieve an aspect of the present invention, a synthetic aperture radar system fluctuation compensating apparatus includes a synthetic aperture radar mounted on a flying unit, a data acquiring unit, a position measuring unit and a position determining unit. The data acquiring unit acquires a reception data by the synthetic aperture radar. The position measuring unit measures a position of the flying unit to generate a position data. The position determining unit determines a correct position of the flying unit based on the reception data and the position data to generate a compensated position data.

The position determining unit may include a compression processing unit, an extracting unit, an error calculating unit and a position calculating unit. The compression processing unit performs a range compressing process to the position data to generate a range compression data. The extracting unit extracts a reflection signal from the range compression data. The error calculating unit calculates a range error based on the reflection signal. The position calculating unit calculates the compensated position data indicative of a position of the flying unit from the range error.

The error calculating unit may perform an unlapping process and a smoothing process to the reflection signal in phase to generate an untapped signal and then calculate the range error based on the untapped signal.

The range compressing process may include a linear frequency modulation in which a frequency of a transmission signal emitted from the synthetic aperture radar is linearly changed.

The compression processing unit may perform a fluctuation compensating process to the position data in addition to the range compressing process to generate the range compression data.

The synthetic aperture radar system fluctuation compensating apparatus may further include a reproducing unit reproducing an image from the reception data based on the compensated position data.

In order to achieve another aspect of the present invention, a method of precisely reproducing an image in a synthetic aperture radar system includes:

transmitting a transmission signal from a synthetic aperture radar mounted on a flying unit;

receiving a reception data by the synthetic aperture radar;

measuring a position of the flying unit to generate a position data;

determining a correct position of the flying unit based on the reception data and the position data to generate a compensated position data; and reproducing an image from the reception data based on the compensated position data.

In order to achieve still another aspect of the present invention, a synthetic aperture radar system includes a synthetic aperture radar, at least 3 electromagnetic wave reflectors, a data acquiring unit, a position measuring unit and a position determining unit. The synthetic aperture radar is mounted on a flying unit. The electromagnetic wave reflectors are provided in a measurement object region at different positions. The data acquiring unit acquires a reception data reflected from the 3 electromagnetic wave reflectors by the synthetic aperture radar. The position measuring unit measures a position of the flying unit to generate a position data. The position determining unit determines a correct position of the flying unit based on the reception data and the position data to generate a compensated position data.

DESCRIPTION OF THE PREFERRED EMBODIMENTS

A synthetic aperture radar system of the present invention will be described below in detail with reference to the attached drawings.

Figure 4:
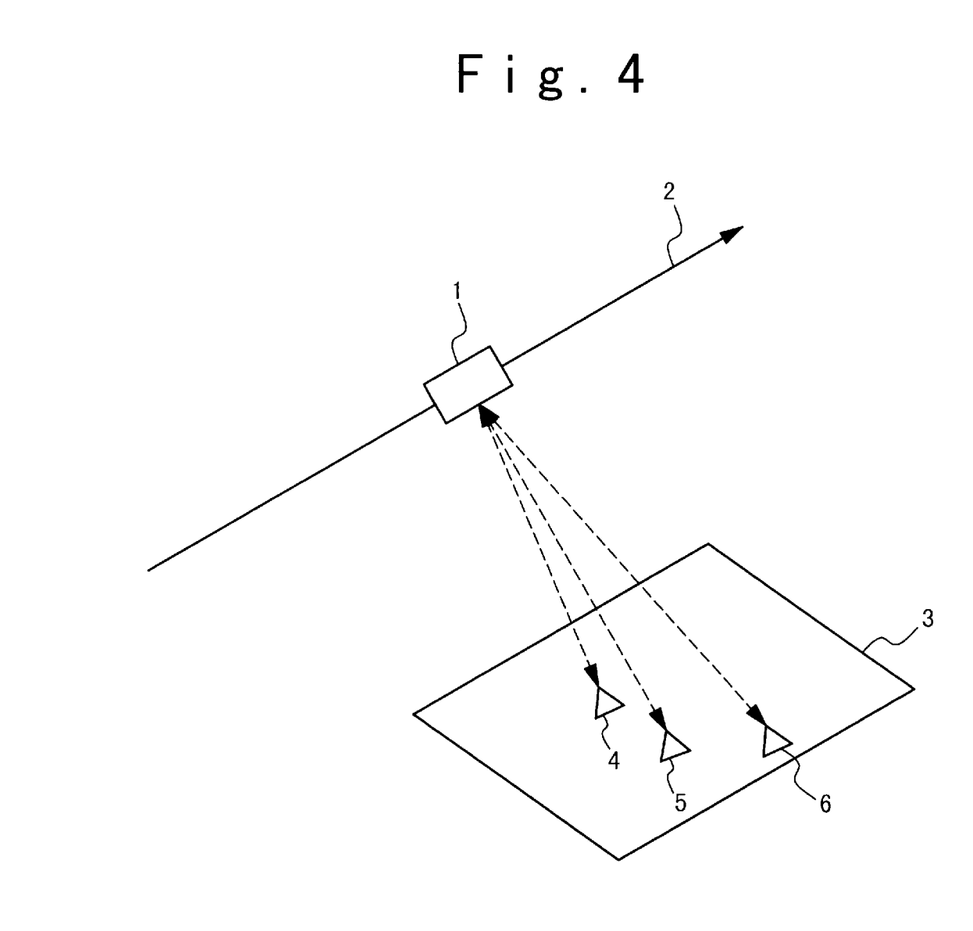
FIG. 4 is a diagram showing a method of measuring the position of a platform in the synthetic aperture radar system according to a first embodiment of the present invention.

FIG. 4 is a diagram showing a method of measuring the position of a platform in the synthetic aperture radar system according to the first embodiment of the present invention.

Referring to FIG. 4, a platform 1 is mounted with a synthetic aperture radar (not shown). The platform 1 moves along a platform flight track 2. A first electromagnetic wave reflector 4, a second electromagnetic wave reflector 5 and a third electromagnetic wave reflector 6 are arranged in a measurement object area 3 in the positions different distances or ranges from the platform 1. The electromagnetic wave reflector used here is the one which reflects a coherent electromagnetic wave to the direction of the electromagnetic wave arrival, and has a large back scatter coefficient. As the reflector is used a corner reflector in which metal plates are combined or an active type electromagnetic wave reflector or repeater in which a reception electromagnetic wave is amplified and sent back to the direction of the reception electromagnetic wave.

Figure 5:
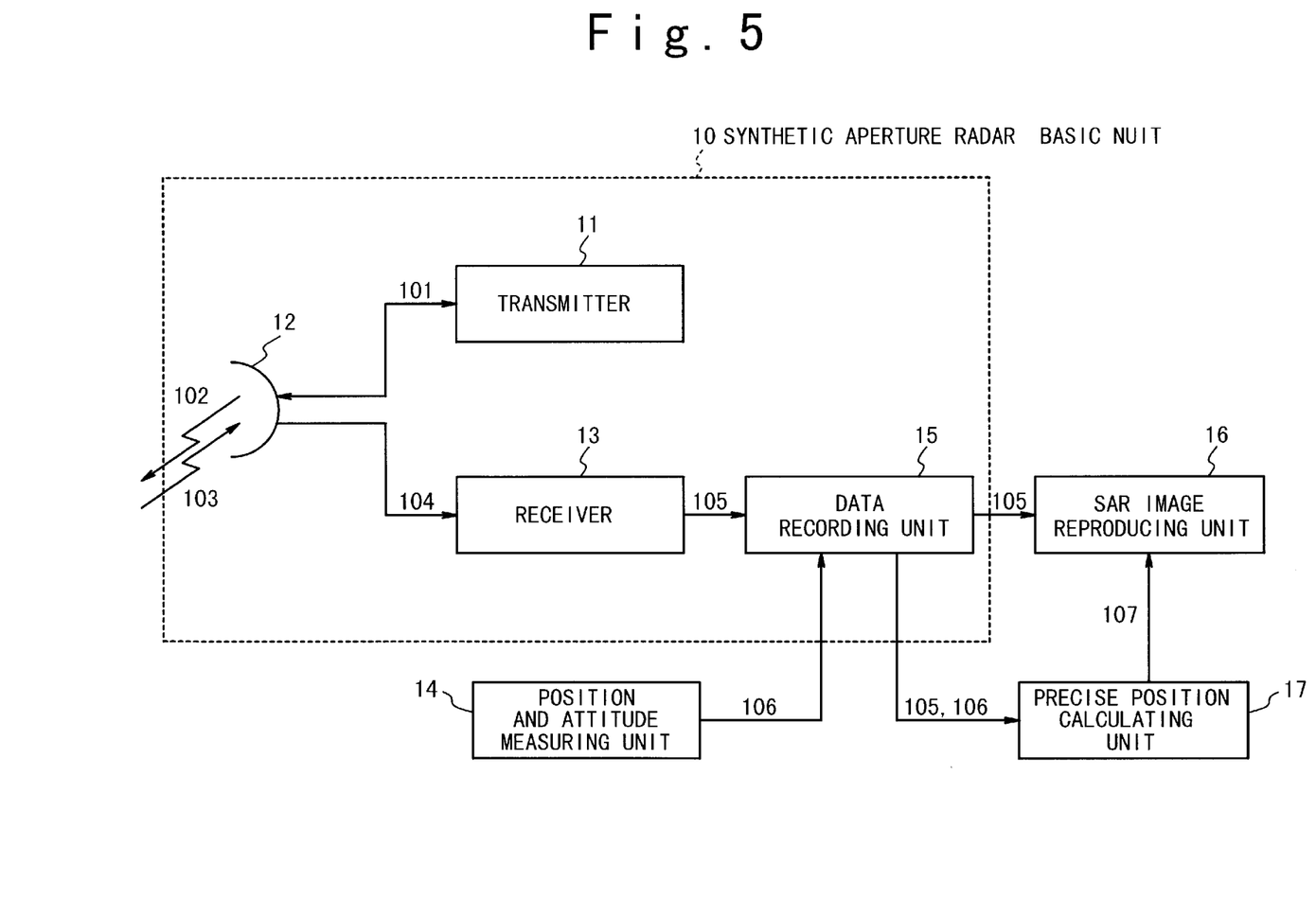
FIG. 5 is a block diagram illustrating the structure of the synthetic aperture radar system according to the first embodiment of the present invention.

FIG. 5 is a block diagram illustrating the structure of the synthetic aperture radar system according to the first embodiment of the present invention. Referring to FIG. 5, a synthetic aperture radar basic unit 10 and a position and attitude measuring unit 14 are mounted on the platform 1. A high frequency signal 101 is generated and amplified by a transmitter 11 and is radiated for the ground as a electromagnetic wave 102 from a transmission and reception antenna 12. The electromagnetic wave 103 is scattered by a target on the ground and is received by the transmission and reception antenna 12. The reception signal 104 is amplified and detected by a receiver 13 and is outputted as an SAR reception data 105 in a complex data format. The SAR reception data 105 is recorded by a data recording unit 15 together with a platform position measurement data 106 which has been measured by the position and attitude measuring unit 14.

After the measurement, the SAR reception data 105 and the platform position measurement data 106 are supplied to a precise position calculating unit 17. The precise position calculating unit 17 calculates the platform precise position data 107 from the SAR reception data 105 and the platform position measurement data 106.

An SAR image reproducing apparatus 16 performs the SAR image reproducing process containing a platform fluctuation compensating process from the SAR reception data 105 and the platform precise position data 107, and outputs an SAR reproduction image of high quality. As the position and attitude measuring unit 14 is used a hybrid apparatus in which a kinematic GPS device and an inertial navigation system are combined.

Figure 6:
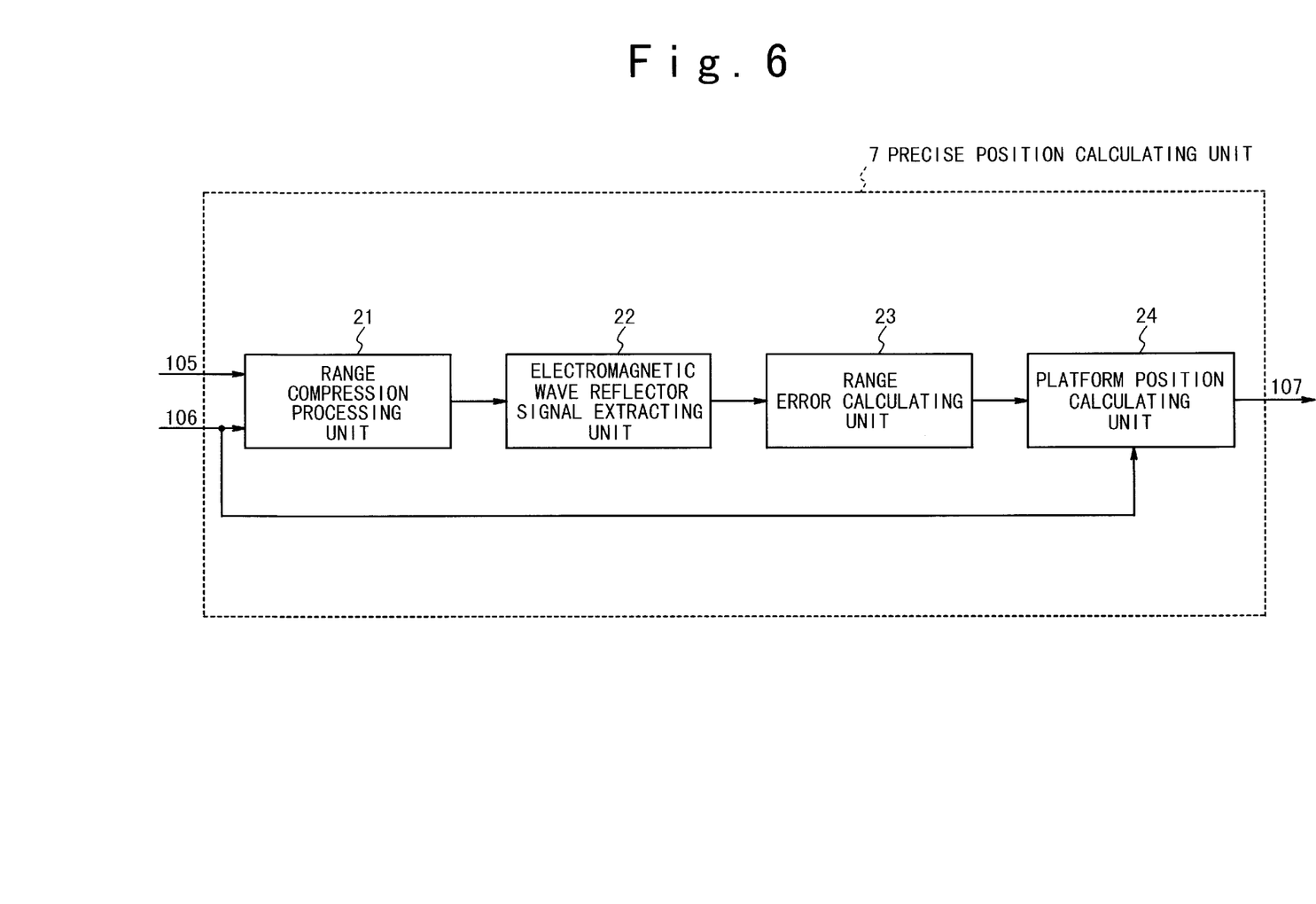
FIG. 6 is a block diagram illustrating the detailed structure of the precise position calculating unit of FIG. 5.

FIG. 6 is a block diagram illustrating the detailed structure of the precise position calculating unit 17 shown in FIG. 5. Referring to FIG. 6, the precise position calculating unit 17 is composed of a range compression processing unit 21, a electromagnetic wave reflector signal extracting unit 22, a range error calculating unit 23 and a platform position calculating unit 24.

Figure 7:
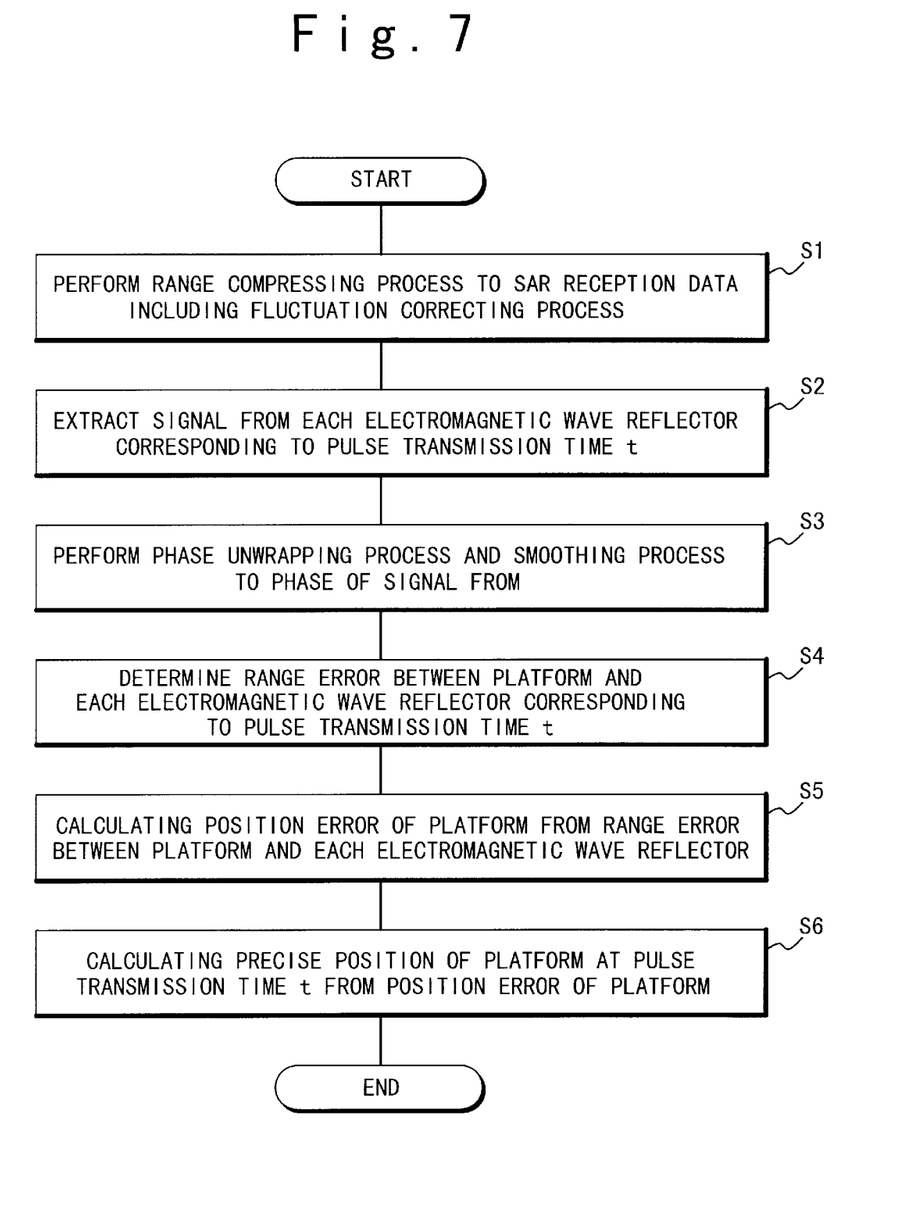
FIG. 7 is a flow chart illustrating the operation of a precise position calculating unit of FIG. 5.
Figure 8:
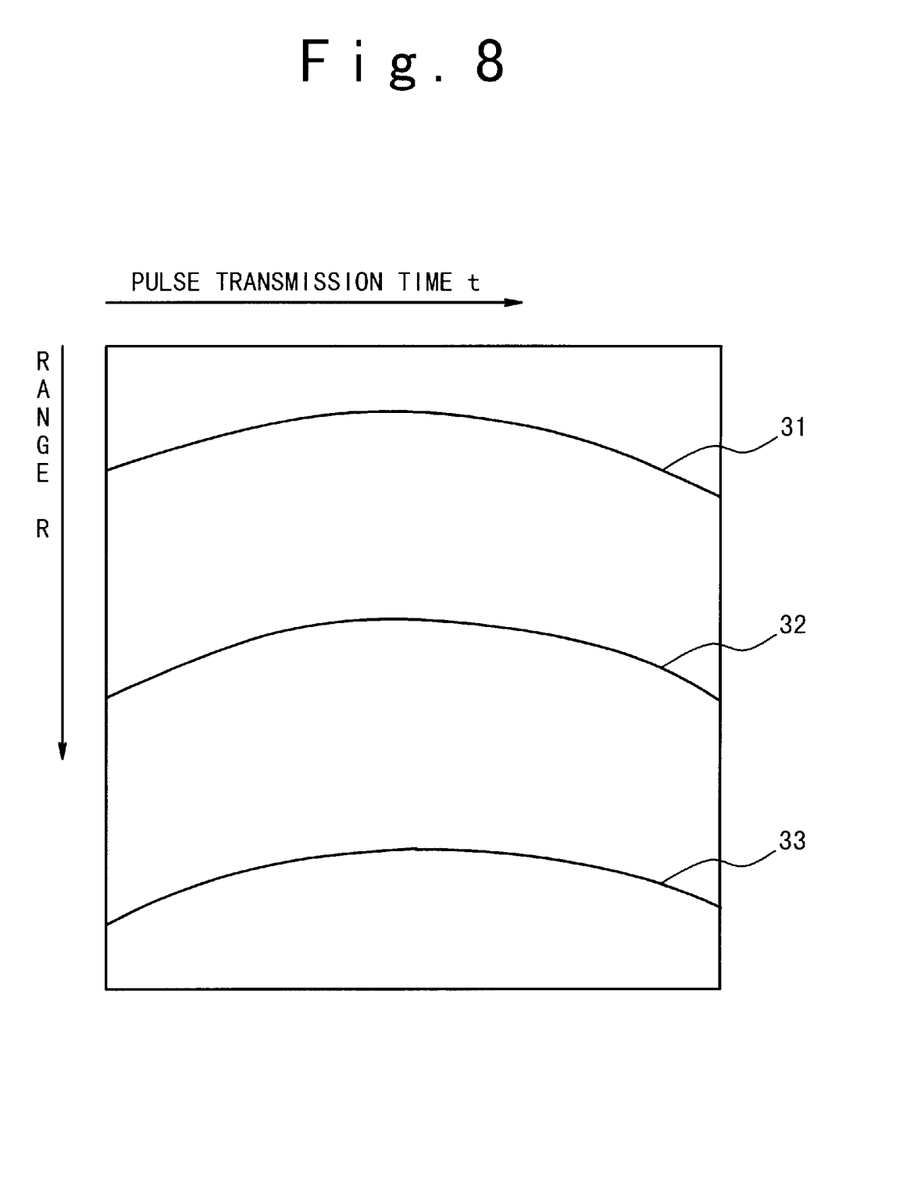
FIG. 8 is a diagram illustrating the intensity image of a signal from a electromagnetic wave reflector after range compression.
Figure 9A:
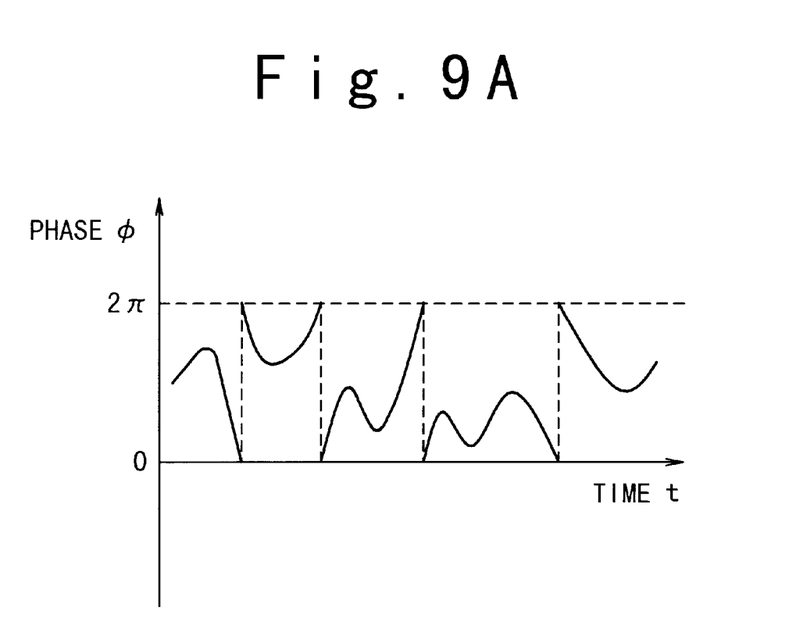
FIGS. 9A and 9B illustrating a phase change before a phase unlapping process and a phase change after the phase unlapping process.
Figure 9B:
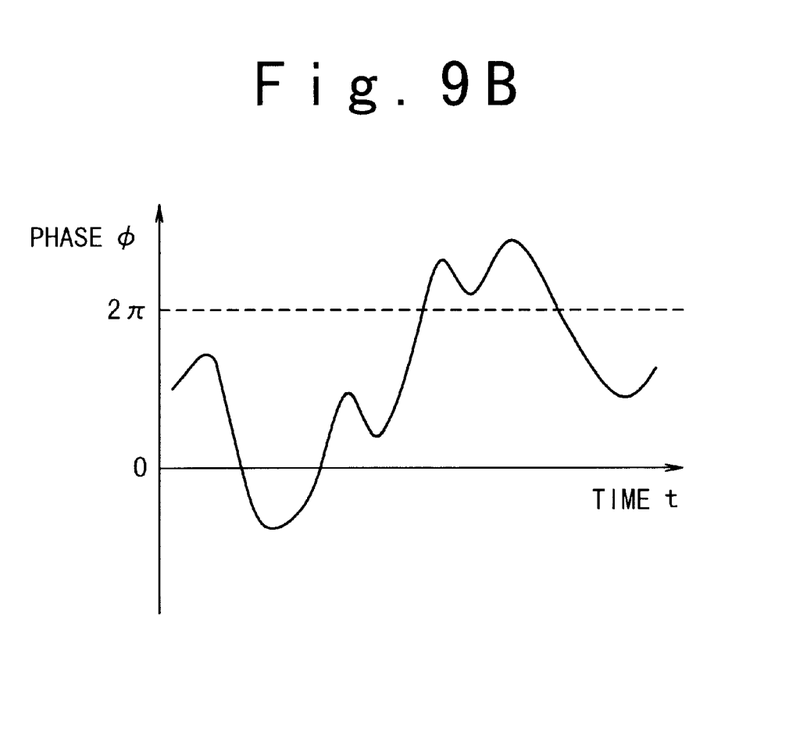

FIG. 7 is a flow chart illustrating the processing operation of the precise position calculating unit 17 shown in FIG. 5. Also, FIG. 8 is a diagram illustrating the Intensity Image of a signal from the electromagnetic wave reflector after range compression, and FIGS. 9A and 9B are diagrams showing phase changes before and after a phase unlapping process, respectively.

A method of calculating the precise platform position according to the first embodiment of the present invention will be described In detail with reference to these FIG. 4 to FIG. 9.

In the following explanation, a symbol i takes any of values of 1, 2 or 3, which correspond to the first electromagnetic wave reflector 4, the second electromagnetic wave reflector 5 or the third electromagnetic wave reflector 6, respectively.

A coordinates system is defined to indicate a position of a three-dimensional space. As shown in FIG. 4, a correct position is known of each of the first electromagnetic wave reflector 4, the second electromagnetic wave reflector 5, and the third electromagnetic wave reflector 6, which are installed in the different positions in the measurement object area 3. The position coordinates of the first electromagnetic wave reflector 4, second electromagnetic wave reflector 5 and the third electromagnetic wave reflector 6 are expressed as (A1, B1, C1), (A2, B2, C2) and (A3, B3, C3), respectively.

A correct position of the platform at a time t is supposed to be [X(t), Y(t), Z(t)]. Also, the position of the platform 1 which has been measured by the position and attitude measuring unit 14 is supposed to be [X'(t), Y'(t), Z'(t)]. That is, measurement errors $\Delta X(t)$, $\Delta Y(t)$, and $\Delta Z(t)$ of the respective components:

$$\Delta X(t)=X'(t)-X(t)$$

$$\Delta Y(t)=Y'(t)-Y(t)$$

$$\Delta Z(t)=Z'(t)-Z(t)$$

Also, it is supposed that the distance between the correct position of the platform 1 and each of the electromagnetic wave reflectors at the time t is Ri(t). Also, it is supposed that the distance between the position of the platform 1 measured by the position and attitude measuring unit 14 and each of the electromagnetic wave reflectors is Ri'(t). In this case, the range error $\Delta Ri(t)$ is $$\Delta Ri(t)=Ri'(t)-Ri(t) \tag{1}$$

where $$Ri(t)=\{[X(t)-Ai(t)]^2+[Y(t)-Bi(t)]^2+[Z(t)-Bi(t)]^2\}^{1/2}$$

$$Ri'(t)=\{[X'(t)-Ai(t)]^2+[Y'(t)-Bi(t)]^2+[Z'(t)-Bi(t)]^2\}^{1/2}$$

The electromagnetic wave 102 is generated by the transmitter 11 at the time t and is radiated from the transmission and reception antenna 12. The electromagnetic wave 102 is reflected by each of the first electromagnetic wave reflector 4, the second electromagnetic wave reflector 5 and the third electromagnetic wave reflector 6. The reflected electromagnetic waves are received by the transmission and reception antenna 12, and then are amplified and detected by the receiver 13 as the SAR reception data. The detected SAR reception data is recorded on a recording medium such as a magnetic tape by the data recording unit 15 in the complex data form. The above-mentioned operation is repeated continuously for every predetermined time interval and a series of SAR reception data for an measurement object area is obtained.

Next, a method of detecting a precise platform position from the SAR reception data and the platform position measurement data 106 will be described with reference to FIG. 6 and FIG. 7.

First, the range compression processing unit 21 performs a range compressing process to the SAR reception data 105. At this time, the above-mentioned fluctuation compensating (correcting) process is also performed using the platform position measurement data 106 which has been measured by the position and attitude measuring unit 14 (FIG. 7, step S1).

In the range compressing process, a linear frequency modulation (a linear FM modulation or chirp) of a transmission signal for one pulse is performed such that the frequency is changed linearly with time. After the back scattered wave is received, the subsequent processes are performed in a method of increasing a distance resolution in a post process.

For example, when the signal intensity of the SAR reception data which has been compressed in the range as mentioned above is reproduced as an image, the image becomes as shown in FIG. 8. In this case, the horizontal direction of the figure indicates a time which a high frequency pulse signal is transmitted and the vertical direction of the figure indicates a distance (range) from the platform 1. In FIG. 8, a track 31 shows the reflection signal from the first electromagnetic wave reflector 4, the track 32 shows the reflection signal from second electromagnetic wave reflector 5 and the track 33 shows the reflection signal from third electromagnetic wave reflector 6.

Next, a signal from each of the electromagnetic wave reflectors is extracted by the electromagnetic wave reflector signal extracting unit 22 in correspondence to each pulse transmission time t (FIG. 7, step S2). As shown in FIG. 8, the signal from the electromagnetic wave reflector can be easily extracted because the signal from the electromagnetic wave reflector is very high in the reception intensity, compared with the other targets.

Next, a range error of each of the extracted electromagnetic wave reflector signals corresponding to each pulse transmission time t is calculated by the range error calculating unit 23. This process is performed in the following procedure.

Because the fluctuation compensating process is performed in the range compressing process, the relation of the phase $\Delta\phi i(t)$ of the electromagnetic wave reflector signal extracted at the time t and the range error $\Delta Ri(t)$ due to the position error of the platform 1 at the time t is:

$$\Delta\phi i(t) = [(-4\pi/\lambda)\Delta Ri(t)] \mod(2\pi) \quad (2)$$

where $\lambda$ is an measurement electromagnetic wave wavelength and mod is remainder calculation. The phase $\Delta\phi i(t)$ takes a value in a range of 0 to $2\pi$, and uncontinuously changes with the elapse of the time t, as shown in FIG. 9A.

Because the range error $\Delta Ri(t)$ never changes rapidly in a short time approximately equivalent to a pulse transmission interval, $\Delta\phi i(t)$ changes smoothly. Therefore, the uncontinuous signals are connected through addition and subtraction calculations of $2n\pi$ (n is an integer) so that the uncontinuous change of $\Delta\phi i(t)$ is eliminated, such that the absolute value of the phase difference between the continuously transmitted adjacent pulse does not become larger than $\pi$, as shown in FIG. 9B. This processing is called a phase unlapping process. Moreover, a smoothing process by a moving average is performed to reduce a phase error due to a receiver noise in the measurement (FIG. 7, step S3).

When the phase of a signal to which the phase unlapping process and the smoothing process are performed is $\Delta\phi i(t)$, the range error $\Delta Ri(t)$ is:

$$\Delta Ri(t) = (-4\pi/\lambda)\Delta\phi i(t) \quad (3)$$

The platform position calculating unit 24 calculates the range errors $\Delta R1(t)$, $\Delta R2(t)$, $\Delta R3(t)$ between the platform 1 and the respective electromagnetic wave reflectors at the each pulse transmission time t (FIG. 7, step S4), respectively. Then, the position errors $\Delta X(t)$, $\Delta Y(t)$, $\Delta Z(t)$ of the platform are calculated from the range errors $\Delta R1(t)$, $\Delta R2(t)$, $\Delta R3(t)$ between the electromagnetic wave reflectors and the platform 1 by solving the simultaneous equations (1) under the condition of i=1, 2, 3 (FIG. 7, step S5). As a result, the precise position $X(t)$, $Y(t)$, and $Z(t)$ of the platform 1 at each pulse transmission time t are, $$X(t) = X'(t) - \Delta X(t)$$

$$Y(t) = Y'(t) - \Delta Y(t)$$

$$Z(t) = Z'(t) - \Delta Z(t)$$

(FIG. 7, step S6).

In the above-mentioned embodiment, it is supposed that the number of electromagnetic wave reflectors is three but it may be N (N is equal to or more than 3). In this case, it is sufficient to change the equation (1) in the platform position calculating unit 24 of the precise position calculating unit 17 from N simultaneous equations (i=1, 2, 3, ... N) into a least squares calculation in such a manner that the platform position errors $\Delta X(t)$, $\Delta Y(t)$, $\Delta Z(t)$ are calculated.

Also, the precise position calculating unit 17 may be realized by use of a control memory and a CPU (not shown). In such a case, a software is stored in the control memory and the CPU executes the software to perform the calculation of the precise position of the platform 1. In the case, as the control memory, a ROM and an IC memory are practicable.

In this way, the SAR reception data is acquired in the condition which 3 or more electromagnetic wave reflectors such as the first electromagnetic wave reflector 4, the second electromagnetic wave reflector 5 and the third electromagnetic wave reflector 6 are arranged in the measurement object area 3. After the measurement, the precise position of the platform 1 is calculated by the precise position calculating unit 17. Therefore, even if it the conventional synthetic aperture radar system is used as the platform loading section just as it is, the platform position having an enough precision can be calculated for the fluctuation compensating process of the synthetic aperture radar and the diastrophism detecting process by the differential interferometry type synthetic aperture radar.

Therefore, the flying body can be compensated in the fluctuation without adding a special unit to the conventional basic SAR system and without a complicated computation, resulting in prevention of the degradation of a resolution. Also, the precocious position of the flying body can be measured so that the detection of the small diastrophism by the differential interferometry type SAR technique is possible.

What is claimed is:

1. A synthetic aperture radar system fluctuation compensating apparatus comprising:

a synthetic aperture radar mounted on a flying unit;

a data acquiring unit for acquiring reception data by said synthetic aperture radar;

a position measuring unit for measuring a position of said flying unit to generate position data; and a position determining unit for determining a correct position of said flying unit based on said reception data and said position data to generate compensated position data, said position determining unit including:

a compression processing unit for performing a range compressing process on said position data to generate range compression data;

an extracting unit for extracting a reflection signal from said range compression data;

an error calculating unit for performing an unlapping process and a smoothing process on said reflection signal in phase to generate an unlapped signal, and then calculating said range error based on said unlapped signal; and a position calculating unit for calculating said compensated position data indicative of a position of said flying unit from said range error.

2. A synthetic aperture radar system fluctuation compensating apparatus according to claim 1, wherein said range compressing process includes a linear frequency modulation in which a frequency of a transmission signal emitted from said synthetic aperture radar is linearly changed.

3. A synthetic aperture radar system fluctuation compensating apparatus according to claim 2, wherein said compression processing unit performs a fluctuation compensating process on said position data in addition to said range compressing process to generate said range compression data.

4. A synthetic aperture radar system fluctuation compensating apparatus according to claim 1, further comprising a reproducing unit for reproducing an image from said reception data based on said compensated position data.

5. A method of precisely reproducing an image in a synthetic aperture radar system comprising:

transmitting a transmission signal from a synthetic aperture radar mounted on a flying unit;

receiving reception data by said synthetic aperture radar;

measuring a position of said flying unit to generate position data;

determining a correct position of said flying unit based on said reception data and said position data to generate compensated position data, said position determining including:

performing a range compression process on said position data to generate range compression data;

extracting a reflection signal from said range compression data;

calculating a range error based on said reflection signal by performing an unlapping process and a smoothing process on said reflection signal in phase to generate an unlapped signal, and then calculating said range error based on said unlapped signal; and calculating said compensated position data indicative of a position of said flying unit from said range error; and reproducing an image from said reception data based on said compensated position data.

6. A method according to claim 1, wherein said range compressing process includes a linear frequency modulation in which a frequency of a transmission signal emitted from said synthetic aperture radar is linearly changed.

7. A method according to claim 1, wherein said performing further includes performing a fluctuation compensating process on said position data in addition to said range compressing process to generate said range compression data.

8. A synthetic aperture radar system comprising:

a synthetic aperture radar mounted on a flying unit;

at least three electromagnetic wave reflectors provided in a measurement object region at different positions;

a data acquiring unit for acquiring reception data reflected from said three electromagnetic wave reflectors by said synthetic aperture radar;

a position measuring unit for measuring a position of said flying unit to generate position data; and a position determining unit for determining a correct position of said flying unit based on said reception data and said position data to generate compensated position data, said position determining unit including:

a compression processing unit for performing a range compressing process on said position data to generate range compression data;

an extracting unit for extracting a reflection signal from said range compression data;

an error calculating unit for performing an unlapping process and a smoothing process on said reflection signal in phase to generate an untapped signal, and then calculating said range error based on said unlapped signal; and a position calculating unit for calculating said compensated position data indicative of a position of said flying unit from said range error.

9. A synthetic aperture radar system according to claim 1, wherein said range compressing process includes a linear frequency modulation in which a frequency of a transmission signal emitted from said synthetic aperture radar is linearly changed.

10. A synthetic aperture radar system according to claim 1, wherein said compression processing unit performs a fluctuation compensating process on said position data in addition to said range compressing process to generate said range compression data.

11. A synthetic aperture radar system according to claim 1, further comprising a reproducing unit for reproducing an image from said reception data based on said compensated position data.

* * * * *